3,100,764
CONTROL OF PENTANE-SOLUBLE POLYMERS IN THE POLYMERIZATION OF PROPYLENE
James L. Jezl, Swarthmore, Habet M. Khelghatian, Springfield, and Louise D. Hague, Villanova, Pa., assignors to Sun Oil Company, Philadelphia, Pa., a corporation of New Jersey
No Drawing. Filed Aug. 4, 1960, Ser. No. 47,353
10 Claims. (Cl. 260—93.7)

This invention relates to the polymerization of propylene, and more particularly to a catalytic system effective to produce a solid polymeric product which is substantially completely insoluble in boiling pentane or n-heptane.

It is known that propylene may be polymerized to a solid, predominantly crystalline polymer by subjecting the monomer, in solution in an inert liquid hydrocarbon, to the action of a metal halide-metal alkyl complex catalyst. A favored catalyst is a titanium trichloride complex with aluminum triethyl, although other halides such as titanium tetrachloride, may be used, and other alkyls, such as aluminum triisobutyl, aluminum triisopropyl, or aluminum tridecyl may be substituted for the aluminum triethyl. Aluminum alkyl halides, such as aluminum ethyl dichloride or aluminum diethyl chloride may also be used as catalyst components. Reaction conditions include a temperature of from 30° C. to 200° C., preferably from 70° C. to 90° C., and pressures sufficient to maintain a propylene concentration in the reaction medium of from 15% to 60% in order to allow the reaction to proceed with desirable rapidity. The process may be operated at atmospheric pressures, however, by bubbling propylene through the reaction medium. Concentration of the titanium halide in the reaction medium is usually from about 0.01 gram to 0.5 gram per 100 cc. of the reaction medium, and the aluminum to titanium ratio should be from about 0.5:1 to about 10:1, preferably from 1:1 to 5:1.

Polymerization in the presence of these catalysts at the indicated reaction conditions will proceed rapidly to yield a solid polymer which apparently consists of three fractions, an amorphous fraction soluble in boiling pentane, a semi-crystalline fraction, believed to be a block polymer having alternate crystalline and amorphous segments, which is soluble in boiling heptane, and an essentially crystalline isotactic fraction insoluble in boiling heptane. In a typical polymerization, the pentane soluble polymer may amount to about 20% or more of the total polymer, and the heptane soluble polymer may amount to about 8% of the pentane-in-soluble polymer. The pentane-soluble polymer, which has little utility, is soluble in the reaction medium at reaction temperatures, and can be readily separated from the pentane-insoluble polymer. It is, however, a waste product, and any means for reducing the amount formed in the reaction would present a great economic improvement in the process.

It is an object of this invention to provide a novel catalyst system which will drastically reduce the percentage of pentane-soluble and heptane-soluble polymer produced in the polymerization of propylene catalyzed by a coordination complex catalyst.

It has now been found that this object may be attained by conducting the polymerization in the presence of a catalyst consisting of a titanium halide, an aluminum alkyl or alkyl halide, and an alkyl or alkenyl N-substituted pyrrolidone. The atomic ratio of aluminum to titanium in the catalyst system should be from about 1:1 to about 10:1, and preferably in the vicinity of 1:1 to 4:1. The atomic ratio of pyrrolidone nitrogen to aluminum must be less than 1:1, since at a ratio of 1:1 or higher only traces of polymer are produced. At preferred ratios of from 1:30 to 2:3, the production of pentane-soluble polymer is drastically reduced as compared with check runs using the same catalyst system without the pyrrolidone. The action of the pyrrolidone in this respect would appear to be unique, since substitution of other nitrogen containing materials for the pyrrolidones does not produce equivalent results. While these other compounds decrease the pentane-soluble polymer somewhat, the decrease is not in the same order of magnitude as that obtained by the use of pyrrolidones.

In order to demonstrate the effect of pyrrolidones in reducing the formation of pentane-soluble polypropylene, the following examples are given.

EXAMPLE I

A catalyst system is made up by adding to one gallon of n-heptane contained in a reactor quantities of N-vinyl 2-pyrrolidone, titanium trichloride, and aluminum triethyl in an atomic ratio of aluminum to titanium to nitrogen of 2:1:1, such that the reactor contains .005 pound of titanium trichloride. The reactor contents are then raised to a temperature of 70° C., and the reactor is pressured with propylene to 140 p.s.i.g. Polymerization begins immediately and is continued for four hours while holding the temperature and pressure constant. The reaction is then terminated by venting excess propylene and adding sufficient methanol to deactivate the catalyst. Eight tenths of a pound of polypropylene, 4.5% of which is soluble in boiling pentane, is recovered from the reaction mixture. Of the pentane-insoluble polymer, 96.9% is insoluble in boiling heptane.

In a control run under identical condition, except that N-vinyl 2-pyrrolidone is omitted from the catalyst, the polymer recovered from the reaction mixture is 20.3% soluble in boiling pentane, and of the pentane-insoluble polymer, only 91.5% is insoluble in boiling heptane.

EXAMPLE II

A polymerization is conducted under the same conditions as Example I, substituting N-propyl 2-pyrrolidone for N-vinyl 2-pyrrolidone. The atomic ratio of aluminum to titanium to nitrogen is 4:1:0.55. The polypropylene produced is 5.4% soluble in boiling pentane.

EXAMPLE III

Another propylene polymerization run is made at the temperature and pressure conditions of Example I. In this run, however, the aluminum component of the catalyst is diethyl aluminum monochloride, and the pyrrolidone is N-butyl 2-pyrrolidone. The mol ratio of aluminum to titanium is 2:1:0.11. The polymer produced is 5.2% soluble in boiling pentane.

EXAMPLE IV

A polymerization is carried out in the same manner as Example II, using titanium tetrachloride instead of titanium trichloride. The pentane-soluble portion of the polymer produced is 7.1%. In a check run, omitting the pyrrolidone from the catalyst, 32.6% of the polymer is pentane-soluble.

In an effort to determine whether or not other organic nitrogen compounds would be effective to reduce the formation of pentane-soluble polymer a number of other nitrogen compounds were tried out under the same temperature-pressure conditions as in the foregoing examples. In each instance the aluminum-titanium-nitrogen ratio was 2:1:1. The aluminum component of the catalyst was aluminum triethyl, and the titanium component was titanium trichloride. Results of the tests are found in the following table.

Table 1

| Nitrogen compound | Percent C$_5$ soluble | C$_5$ insolubles: Percent C$_7$ insoluble |
|---|---|---|
| None | 20.3 | 91.5 |
| Ammonia | 22.4 | 90.2 |
| Diallyl aniline | 13.1 | 95.8 |
| Dodecylamine | 17.8 | 91.7 |
| 5-diethylaminopentene-1 | 24.4 | 88.7 |
| Diethylamine | 13.2 | 95.8 |
| Triethylamine | 17.8 | 92.4 |

As may be observed, while some of the nitrogen compounds reduced pentane-solubles to some extent, they were not nearly as effective as the N-substituted pyrrolidones. The best of the compounds studied, diallyl aniline, reduces pentane-solubles by only 36%, whereas N-vinyl 2-pyrrolidone reduces the pentane-solubles by 78%, and the other pyrrolidones give comparable reductions.

The invention claimed is:

1. A catalytic system consisting essentially of a titanium compound selected from the group consisting of titanium trichloride and titanium tetrachloride, an organo-aluminum compound selected from the group consisting of aluminum alkyls and aluminum alkyl halides, and an N-substituted pyrrolidone, the substituent being selected from the group consisting of alkyl and alkenyl radicals, wherein the atomic ratio of aluminum to titanium is from 1:1 to 10:1 and the atomic ratio of aluminum to pyrrolidone nitrogen is from 30:1 to 3:2.

2. The catalyst system according to claim 1 in which the titanium compound is titanium trichloride.

3. The catalyst system according to claim 2 in which the pyrrolidone is N-vinyl 2-pyrrolidone.

4. The catalyst system according to claim 2 in which the pyrrolidone is N-propyl 2-pyrrolidone.

5. The catalyst system according to claim 2 in which the pyrrolidone is N-butyl 2-pyrrolidone.

6. A process for polymerizing propylene which comprises contacting propylene at a temperature of from 30° C. to 200° C. with a catalyst system consisting essentially of a halide selected from the group consisting of titanium trichloride and titanium tetrachloride, an organo-aluminum compound selected from the group consisting of aluminum alkyls and aluminum alkyl halides, and an N-substituted pyrrolidone, the substituent being selected from the group consisting of alkyls and alkenyl radicals, wherein the atomic ratio of aluminum to titanium is from 1:1 to 10:1, and the atomic ratio of aluminum to pyrrolidone is from 30:1 to 3:2, and recovering a solid, predominantly isotactic, polymer of propylene.

7. The process according to claim 6 in which the halide is titanium trichloride.

8. The process according to claim 7 in which the pyrrolidone is N-vinyl 2-pyrrolidone.

9. The process according to claim 7 in which the pyrrolidone is N-propyl 2-pyrrolidone.

10. The process according to claim 7 in which the pyrrolidone is N-butyl 2-pyrrolidone.

References Cited in the file of this patent

FOREIGN PATENTS

| 559,727 | Belgium | Jan. 31, 1958 |
| 809,717 | Great Britain | Mar. 4, 1959 |